US012710766B2

(12) United States Patent
Huang et al.

(10) Patent No.: US 12,710,766 B2
(45) Date of Patent: Aug. 18, 2026

(54) METHOD FOR EDGE CLEANING

(71) Applicant: Dyson Technology Limited, Malmesbury (GB)

(72) Inventors: Yao Huang, Singapore (SG); Peng Ma, Singapore (SG); Zhiheng Xu, Singapore (SG)

(73) Assignee: Dyson Technology Limited, Malmesbury (GB)

( * ) Notice: Subject to any disclaimer, the term of this patent is extended or adjusted under 35 U.S.C. 154(b) by 95 days.

(21) Appl. No.: 18/718,130

(22) PCT Filed: Nov. 18, 2022

(86) PCT No.: PCT/GB2022/052931
§ 371 (c)(1),
(2) Date: Jun. 10, 2024

(87) PCT Pub. No.: WO2023/105188
PCT Pub. Date: Jun. 15, 2023

(65) Prior Publication Data

US 2025/0085720 A1 Mar. 13, 2025

(30) Foreign Application Priority Data

Dec. 10, 2021 (GB) ...................................... 2117846

(51) Int. Cl.
*G05D 1/648* (2024.01)
*A47L 9/28* (2006.01)
*A47L 11/40* (2006.01)

(52) U.S. Cl.
CPC .......... *G05D 1/6484* (2024.01); *A47L 9/2852* (2013.01); *A47L 11/4011* (2013.01); *A47L 2201/04* (2013.01)

(58) Field of Classification Search
CPC .. G05D 1/6484; G05D 1/0219; G05D 1/0274; G05D 1/0214; G05D 1/0088;
(Continued)

(56) References Cited

U.S. PATENT DOCUMENTS 9,630,319 B2 4/2017 Vicenti
10,488,865 B2 11/2019 Afrouzi et al.
(Continued)

FOREIGN PATENT DOCUMENTS

CN 102138769 B 12/2014
CN 109240301 A 1/2019
(Continued)

*Primary Examiner* — Bao Long T Nguyen
(74) *Attorney, Agent, or Firm* — Tucker Ellis LLP

(57) ABSTRACT

A method for generating a set of cleanable perimeter segments of an area to be cleaned by a robotic cleaner. Each cleanable perimeter segment defines a path to be followed by the robotic cleaner around an edge of the area to be cleaned. The method includes receiving an occupancy grid map of the area to be cleaned; generating a contiguous accessible area grid map of the area to be cleaned based on the occupancy grid map; determining an outer boundary of each contiguous inaccessible region in the occupancy grid map; and generating the set of cleanable perimeter segments by extracting the outer boundary of each contiguous inaccessible region as a separate perimeter segment. Each perimeter segment includes a plurality of sequential grid elements defining the path to be followed by the robotic cleaner around an edge of the area to be cleaned.

19 Claims, 12 Drawing Sheets

(58) Field of Classification Search
CPC .. G05D 1/6482; G05D 1/2464; A47L 9/2852; A47L 11/4011; A47L 2201/04; A47L 2201/06
See application file for complete search history.

(56) References Cited

U.S. PATENT DOCUMENTS

| | | | | |
|---|---|---|---|---|
| 11,119,216 | B1 | 9/2021 | Ebrahimi Afrouzi | |
| 2005/0171644 | A1 * | 8/2005 | Tani | G05D 1/0259 701/25 |
| 2015/0367512 | A1 | 12/2015 | Hong et al. | |
| 2016/0100522 | A1 | 4/2016 | Yamauchi et al. | |
| 2016/0271795 | A1 * | 9/2016 | Vicenti | G05D 1/644 |
| 2020/0069140 | A1 | 3/2020 | Orzechowski et al. | |
| 2020/0150655 | A1 * | 5/2020 | Artes | G05D 1/0016 |
| 2021/0286368 | A1 * | 9/2021 | Jung | A01D 34/008 |

FOREIGN PATENT DOCUMENTS

| | | | |
|---|---|---|---|
| CN | 109984689 | A | 7/2019 |
| CN | 111123932 | A | 5/2020 |
| CN | 107390698 | B | 12/2020 |
| GB | 2584839 | A | 12/2020 |
| JP | 2004049778 | A | 2/2004 |
| JP | 2004248710 | A | 9/2004 |
| KR | 101357819 | B1 | 2/2014 |
| KR | 101506738 | B1 | 3/2015 |
| KR | 101667708 | B1 | 10/2016 |
| KR | 20210004763 | A | 1/2021 |
| KR | 102230362 | B1 | 3/2021 |
| KR | 102275300 | B1 | 7/2021 |
| WO | 2003062936 | A1 | 7/2003 |

* cited by examiner

METHOD FOR EDGE CLEANING

RELATED APPLICATION DATA

This application is a national phase application of International Application No. PCT/GB2022/052931, filed Nov. 18, 2022, which claims priority to GB Application 2117846.2, filed Dec. 10, 2021.

FIELD OF THE INVENTION

The present invention relates to a method for edge cleaning and to a robotic cleaner. The present invention relates particularly, although not exclusively, to a method for generating a set of cleanable perimeter segments of an area to be cleaned by a robotic cleaner.

BACKGROUND

Robotic cleaners are autonomous cleaning devices which can be used to clean floors, surfaces and walls. A key advantage over traditional cleaning devices is that they do not require continuous manual operation by a human.

Some of the first robotic cleaners followed a random cleaning pattern, moving around a room in a random path, changing direction when the robotic cleaner hit a wall or obstacle. However, such a random cleaning pattern often results in inefficient cleaning, with some areas being missed, and some areas being repeatedly cleaned. Furthermore, these robotic cleaners were vulnerable to hazards, such as stairs.

To address some of these problems, some robotic cleaners include sensors to map an area to be cleaned, and to detect walls, obstacles or hazards. Using sensors also helps to avoid collisions with obstacles and walls.

Generally, robotic cleaners clean the environment following a single cleaning pattern, such as an oil drop pattern (e.g. a spiral pattern extending from an initial position of the robotic cleaner). As such, a single cleaning pattern is used without distinguishing between open areas and edge areas (e.g. adjacent to a wall or obstacle). This type of cleaning pattern allows a robotic cleaner to efficiently and effectively clean open spaces, such as the centre of a room, and also helps to ensure that all areas of an open space are cleaned.

However, as cleaning patterns such as the oil drop pattern is planned mainly considering the navigability of the path, and ignoring the layout and shape of the environment and area to be cleaned, when a robotic cleaner follows such a cleaning pattern, it may not followed edges of walls or obstacles, such as furniture, closely, and may also fail to clean deep into the corners. This may lead to poor edge and corner coverage. An improved cleaning pattern with improved edge and corner coverage would be beneficial in more efficiently and effectively cleaning a room.

The present invention has been devised in light of the above considerations.

SUMMARY OF THE INVENTION

According to a first aspect, there is provided a method for generating a set of cleanable perimeter segments of an area to be cleaned by a robotic cleaner, each cleanable perimeter segment defining a path to be followed by the robotic cleaner around an edge of the area to be cleaned, the method comprising:

- receiving an occupancy grid map of the area to be cleaned, wherein the occupancy grid map defines occupied regions of the area to be cleaned;
- generating a contiguous accessible area grid map of the area to be cleaned based on the occupancy grid map, wherein the accessible area grid map defines the region of the area to be cleaned that the robotic cleaner can access;
- determining one or more contiguous inaccessible regions in the occupancy grid map based on the contiguous accessible area grid map;
- determining an outer boundary of each contiguous inaccessible region in the occupancy grid map; and
- generating the set of cleanable perimeter segments by extracting the outer boundary of each contiguous inaccessible region as a separate perimeter segment, each perimeter segment comprising a plurality of sequential grid elements defining the path to be followed by the robotic cleaner around an edge of the area to be cleaned.

In this way, by determining the edges of the area to be cleaned by the robotic cleaner from the inaccessible regions, an edge clean pattern following along the shape of the edges and corners can be planned. The robotic cleaner is then able to follow a tighter path closer to the corners and edges, thus providing a better cleaning coverage than previous cleaning patterns.

Optional features will now be set out. The following optional features are combinable singly or in combination with any aspect of the invention.

An area to be cleaned may be a room, a plurality of rooms, or a subsection of a room, for example.

As used herein, the term "contiguous" may be considered as referring to a single, continuous, uninterrupted, connected block. For example, the contiguous accessible area grid map may define a single, connected accessible area (e.g. the area that the robotic cleaner can access from its current location). The single, connected accessible area may be surrounded on all sides by one or more inaccessible areas. A contiguous inaccessible region may define a single, connected, inaccessible region.

The contiguous accessible grid map may be generated based on a current location of the robotic cleaner. In some examples, the current location of the robotic cleaner may be detected using one or more sensors and/or one or more cameras, which may be located on the robotic cleaner. Alternatively/additionally, the current location of the robotic cleaner may be detected using mapping techniques and/or a known original position of the robotic cleaner. The current location of the robotic cleaner may be received by the robotic cleaner, e.g. from an external device or source, such as a remote server.

The method may also comprise receiving a restriction grid map defining one or more target regions of the area to be cleaned, and/or one or more forbidden regions of the area to be cleaned. The one or more target regions may be regions of the area to be cleaned that should be prioritized or should be cleaned first/next, and the one or more forbidden regions may be regions of the area to be cleaned that should not be cleaned by the robotic cleaner and/or should not be accessed by the robotic cleaner.

The restriction grid map may be user-defined. For example, a user may specify in the restriction grid map the areas of a room (or subsection of a room) which the robotic cleaner should clean first (e.g. especially dirty areas), and areas which the robotic cleaner should not access or clean (e.g. near stairs).

The restriction grid map may be received from an external device or source, such as a remote server or a mobile device.

Optionally, after an outer boundary of each contiguous inaccessible region has been determined, the method may further comprise discarding one or more of the determined outer boundaries.

In particular, the method may comprise discarding any outer boundaries of the one or more contiguous inaccessible regions if they are located in a forbidden region defined in the restriction grid map. In particular, a location of the outer boundaries may be compared to the restriction grid map in order to determine whether any of the outer boundaries are located in a forbidden region. In this way, a validity check is performed such that the robotic cleaner will avoid the regions where cleaning is forbidden or not wanted.

The method may comprise discarding any outer boundaries of the one or more contiguous inaccessible regions if they are already cleaned. In this way, the same region of the area to be cleaned is not cleaned multiple times, thus providing a more efficient cleaning pattern. The method may comprise determining whether an outer boundary is already cleaned, e.g. based on a cleaning tracking history (which may be stored on the robotic cleaner) and/or using one or more sensors which may be located on the robotic cleaner. Optionally, information relating to whether an outer boundary is already cleaned or not may be received by the robotic cleaner, e.g. from an external device or source, such as a remote server. For example, the restriction grid map may also define one or more already-cleaned regions of the area to be cleaned, wherein the one or more already-cleaned regions should not be cleaned (again) by the robotic cleaner. The robotic cleaner may update the set of cleanable perimeter segments to mark a perimeter segment as visited/cleaned once it has cleaned that segment. This may stop the robotic cleaner repeatedly cleaning the same perimeter segment.

The method may comprise discarding any perimeter segments having a number of grid elements less than a predefined threshold. In this way, perimeter segments that are too short may be discarded such that the robotic cleaner does not clean those short perimeter segments. This provides a balance of providing an effective clean of the entire area to be cleaned, with performing the clean as efficiently as possible. In particular, discarding any perimeter segments having a number of grid elements less than a predefined threshold allows for a more efficient clean. The predefined threshold may be 2, 3, 4, 5, . . . etc. grid elements.

The contiguous accessible area grid map may be a Boolean element grid map, for example (e.g. true indicates accessible).

Generating a contiguous accessible area grid map may comprise performing a flood fill from a current location of the robotic cleaner.

The one or more contiguous inaccessible regions may be determined by running a contiguous region find on the accessible area grid map.

The method may further comprise discarding any inaccessible regions having an area smaller than a predefined threshold. In this way, any inaccessible regions that are too small may be discarded, and thus a cleanable perimeter segment corresponding to an outer boundary of that inaccessible region may not be determined. This allows for a more efficient clean, e.g. by not cleaning around objects that are deemed too small. The predefined threshold may be less 2×2 grid elements, for example.

In some examples, the plurality of sequential grid elements in each perimeter segment define a path to be followed in a left direction along the respective edge. As such, in these examples, the robotic cleaner follows the edges or walls and/or objects in a left direction.

In alternative examples, the plurality of sequential grid elements in each perimeter segment define a path to be followed in a right direction along the respective edge. As such, in these examples, the robotic cleaner follows the edges or walls and/or objects in a right direction.

Optionally, determining an outer boundary of each contiguous inaccessible region may comprise determining a plurality of accessible grid elements in the occupancy grid map adjacent to at least one grid element of an inaccessible region in the occupancy grid map. As such, the accessible grid elements neighbouring the inaccessible region are selected as the outer boundary of the inaccessible region. This allows for a tight cleaning path along an edge.

The outer boundary of each contiguous inaccessible region may be determined based on a shape and/or dimension of the robotic cleaner. In particular, data relating to the shape and/or dimension of the robotic cleaner may be used in the determination of the outer boundary of each contiguous inaccessible region.

This data may be stored on the robotic cleaner, or may be received by the robotic cleaner from an external device or source, such as a remote server. In this way, the shape and size of the robotic cleaner is taken into account when the cleaning path is calculated, allowing the robotic cleaner to clean closer to the edges and corners.

The occupancy grid map may be received by the robotic cleaner from an external device or source, such as a server. Alternatively, the occupancy grid map may be generated based on data captured from a sensor of the robotic cleaner, e.g. during a previous clean, such as during an open area clean performed before the edge clean.

The method may be performed by a processor located on the robotic cleaner. As such, the robotic cleaner itself may detect the edges and determine the cleaning path to follow to perform the edge clean.

This may allow for more efficient processing, as communication with an external, remote device is not required.

Alternatively, an external device, such as a remote server may perform the method. The set of cleanable perimeter segments may then be transmitted to the robotic cleaner so that the robotic cleaner can perform the edge clean.

The method may be computer-implemented.

The method may further comprise performing, by the robotic cleaner, an edge clean in a path defined by the set of cleanable perimeter segments.

Optionally, the method may further comprise processing a cleanable perimeter segment of the area to be cleaned by the robotic cleaner.

Processing the cleanable perimeter segment may comprise:

- calculating an angular change of the edge at a plurality of waypoints along the cleanable perimeter segment;
- detecting one or more waypoints corresponding to a turning point of the cleanable perimeter segment, wherein a waypoint corresponds to a turning point if a magnitude of the angular change at the waypoint is greater than or equal to a first predefined threshold;
- sampling a subset of the waypoints, wherein the sampled subset of waypoints includes at least the waypoints corresponding to the turning points; and
- generating an optimized cleanable perimeter segment, wherein the optimized cleanable perimeter segment comprises the sampled subset of waypoints defining the path to be followed by the robotic cleaner around the edge of the area to be cleaned.

In this way, the resolution of the cleanable perimeter segment is reduced, without losing the detail of any edge corners, whether internal or external corners, thus increasing the efficiency of motion execution of the robotic cleaner. This helps to improve edge clean coverage, whilst increasing the cleaning rate of the edges. This may provide a cleaning pattern with reduced battery costs, and which may also reduce the wear and tear of the robotic cleaner.

The first predefined threshold may be between 20° and 90°, more preferably between 30° and 60°, more preferably between 40° and 50°. In preferred examples, the first predefined threshold may be 45°.

The sampled subset of waypoints may include one or more straight edge waypoints, wherein a waypoint is a straight edge waypoint if a magnitude of the angular change at the waypoint is less than the first predefined threshold. In this way, the sampled subset of waypoints may include some waypoints corresponding to a turning point, and some waypoints corresponding to a straight edge. This may provide sufficient resolution of the cleanable perimeter segment for the robotic cleaner to closely follow the edges.

Preferably, a distance between neighbouring waypoints in the sampled subset is equal to or greater than a second predefined threshold. This may improve the efficiency of the edge clean, by providing less resolution of the path to be followed. The second predefined threshold may be approximately equal to the size, or diameter, of the robotic cleaner. It may be equal to 10, more preferably 12, more preferably 14, more preferably 16, etc. grid elements, for example. Each grid element may be 20 mm×20 mm, for example.

The distance between neighbouring waypoints in the sampled subset may be equal to or less than a third predefined threshold. This may ensure sufficient resolution of the cleanable perimeter segment for the robotic cleaner to closely follow the edges. The distance between neighbouring waypoints may have an upper and lower limit. The third predefined threshold may be equal to 10, more preferably 9, more preferably 8, more preferably 7, etc. grid elements, for example.

The processing method may further comprise determining whether, within a subsection of the cleanable perimeter segment having a distance equal to the second predefined threshold, there are a plurality of waypoints corresponding to a turning point, and if so:

- determining the waypoint within the subsection having the largest angular change and maintaining that waypoint; and
- discarding the other waypoints corresponding to a turning point within the subsection.

As such, only the turning point with the largest turning angle is maintained as a waypoint. This allows for an accurate representation of the turning point, whilst maintaining a reduced resolution, thus increasing cleaning efficiency.

The angular change of a waypoint may be detected by calculating the angle from a vector from a previous neighbouring waypoint to the waypoint, towards the vector from the waypoint to a next neighbouring waypoint.

The method may comprise comprising shifting each waypoint in the cleanable perimeter segment, or in the optimized cleanable perimeter segment, towards a closest edge of the area to be cleaned. This may further improve the cleaning coverage of the edges and corners, and may reduce the effect of sensor noise, for example.

Each waypoint may be shifted towards a closest edge by a predefined distance, which may be greater than or equal to 10 mm, and less than or equal to 80 mm, for example. The predefined distance may be between 20 mm and 60 mm, more preferably between 30 and 50 mm, more preferably 40 mm, for example. A predefined distance of 40 mm may correspond to shifting each waypoint two grid elements towards a closest edge, when each grid element is 20 mm×20 mm.

A closest edge for each waypoint may be detected by a local sensor of the robotic cleaner. This may be a camera, or other vision sensor, an infrared sensor, or a time of flight sensor, for example.

Each waypoint may be shifted towards a closest edge in a direction perpendicular to a bisector of the angle between a vector from a previous neighbouring waypoint to the waypoint, and the vector from the waypoint to a next neighbouring waypoint. This ensures that the waypoints are shifted in a manner so as to accurately trace the edge.

The method may further comprise performing, by the robotic cleaner, an edge clean in a path defined by an optimized cleanable perimeter segment.

Optionally, the method may further comprise determining an order for cleaning the set of cleanable perimeter segments. Each cleanable perimeter segment may define a path to be followed by the robotic cleaner around an edge of the area to be cleaned from a head of the perimeter segment to a tail of the perimeter segment.

The ordering method may comprise:

- determining a plurality of possible orders for cleaning the set of cleanable perimeter segments;
- calculating, for each of the plurality of possible orders, a traverse cost for cleaning the set of cleanable perimeter segments, wherein the traverse cost for each of the plurality of possible orders is calculated based on a current location of the robotic cleaning device and the relative distances between the cleanable perimeter segments in the respective order;
- determining an optimized order for cleaning the set of cleanable perimeter segments based on the calculated traverse costs for each of the plurality of possible orders.

In this way, the optimized order for cleaning the perimeter segments is determined, thus improving edge clean efficiency (e.g. compared to simply choosing the perimeter segment closest to a current location of the robotic cleaner). This may result in a quicker total cleaning time, and thus the use of less power, increasing battery life, and decreasing wear and tear of the robotic cleaner.

The area to be cleaned by the robotic cleaner may be defined as an occupancy grid map comprising a plurality of grid elements. Thus, the relative distances between the cleanable perimeter segments may be based on the number of grid elements between the respective perimeter segments.

Optionally, each of the possible orders of the set of cleanable perimeter segments may be determined (e.g. all possible combinations may be determined).

The optimized order may be the order with the smallest traverse cost.

The optimized order may be disregarded if the distance between the current location of the robotic cleaner and the head of the first perimeter segment in the optimized order is greater than a fourth predefined threshold. In this way, if a determined first perimeter segment in the optimized order is too far away, the optimized order is overridden/ignored. In these examples, when the optimized order is disregarded, the order for cleaning the set of cleanable perimeter segments is based on a closest head of a perimeter segment relative to the current location of the robotic cleaner. The fourth predefined threshold may be a predefined number of grid elements, e.g.

40 grid elements, more preferably 30 grid elements, more preferable 20 grid elements, for example.

Optionally, the traverse cost may be calculated and the optimized order may be determined only when the distance between the current location of the robotic cleaner and a head of a perimeter segment is greater than a fifth predefined threshold. In this way, if it is detected that a head of a perimeter segment is very close to the robotic cleaner, that perimeter segment is cleaned first, even if that may not be the optimal order. In particular, when the distance between the current location of the robotic cleaner and a head of a perimeter segment is less than the fifth predefined threshold, the order for cleaning the set of cleanable perimeter segments is based on a closest head of a perimeter segment relative to the current location of the robotic cleaner. The fifth predefined threshold may be a predefined number of grid elements, e.g. 8 grid elements, more preferably 6 grid elements, more preferably 4 grid elements, for example.

The optimized order may be disregarded if the distance between the current location of the robotic cleaner and a head of a perimeter segment different to the first perimeter segment in the optimized order is less than a sixth predefined threshold. As such, when the first perimeter segment in the optimized order is much further away from a current location of the robot than a closest perimeter segment, which is not the first perimeter segment in the optimized order, the optimized order may be disregarded. When the distance between the current location of the robotic cleaner and a head of a perimeter segment different to the first perimeter segment in the optimized order is greater than the sixth predefined threshold, the order for cleaning the set of cleanable perimeter segments may be based on a closest head of a perimeter segment relative to the current location of the robotic cleaner. The sixth predefined threshold may be a predefined number of grid elements, e.g. 8 grid elements, more preferably 6 grid elements, more preferably 4 grid elements, for example.

Preferably, the traverse cost for each possible order may be calculated and the optimized order may be determined only when the number of possible orders for cleaning the set of cleanable perimeter segments is less than a seventh predefined threshold. As such, there is a maximum number of perimeter segments which the optimized order may be calculated for. This balances the need for an optimized route with the additional processing costs required to determine the optimized route.

When the number of possible orders for cleaning the set of cleanable perimeter segments is greater than the seventh predefined threshold, the order for cleaning the set of cleanable perimeter segments may be based on a closest head of a perimeter segment relative to the current location of the robotic cleaner. The seventh predefined threshold may be 10, more preferably 9, more preferably 8 perimeter segments, for example.

The traverse cost for an order may be calculated at least in part by summing the relative distance between the current location of the robotic cleaner and the head of the first perimeter segment in the order, and for each subsequent perimeter segment in the order, the relative distance between the head of that perimeter segment and the tail of the previous perimeter segment in the order. As such, the relative distances between perimeter segments is calculated for each of the plurality of possible orders.

The traverse costs for an order may be calculated at least in part using a weight factor between 0 and 1 to account for the current location of the robotic cleaner.

For example, the traverse cost for an order may be calculated using the formula:

Total cost for an order=(weight factor)×(relative distance between the current location of the robotic cleaner and the head of the first perimeter segment in the order)+(1-weight factor)×(for each subsequent perimeter segment in the order, the relative distance between the head of that perimeter segment and the tail of the previous perimeter segment in the order).

The method may further comprise discarding any perimeter segments in the set of perimeter segments that have already been cleaned prior to determining the plurality of possible orders for cleaning the set of perimeter segments. In this way, the same region of the area to be cleaned is not cleaned multiple times, thus providing a more efficient cleaning pattern. The method may comprise determining whether an outer boundary is already cleaned, e.g. based on a cleaning tracking history (which may be stored on the robotic cleaner) and/or using one or more sensors which may be located on the robotic cleaner. Optionally, information relating to whether a perimeter segment is already cleaned or not may be received by the robotic cleaner, e.g. from an external device or source, such as a remote server. The robotic cleaner may update the set of cleanable perimeter segments to mark a perimeter segment as visited/cleaned once it has cleaned that segment. This may stop the robotic cleaner repeatedly cleaning the same perimeter segment.

The method may further comprise performing, by the robotic cleaner, an edge clean in a path defined by the optimized order of the set of cleanable perimeter segments.

According to a second aspect of the invention, there is provided a system including one or more processors and a memory, the memory containing machine executable instructions which, when executed on the one or more processors, cause the one or more processors to perform the method of the first aspect.

The system may be located on the robotic cleaner.

Alternatively, the system may be located on an external device remote from the robotic cleaner but in communication (e.g. via an un-wired connection) to the robotic cleaner. The external device may be a remote server, for example.

According to a third aspect, there is provided a robotic cleaner comprising the system of the second aspect.

According to a fourth aspect, there is provided a non-transitory computer readable storage medium containing machine executable instructions which, when executed on a processor, cause the processor to perform the method of the first aspect.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
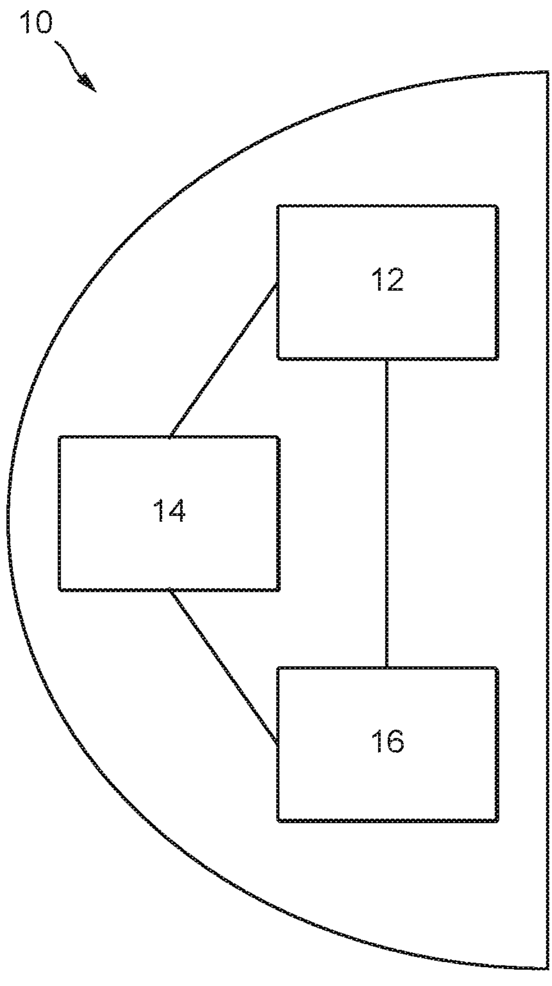
FIG. 1 is a schematic representation of a robotic cleaner.

FIG. 1 is a schematic representation of a robotic cleaner 10, which may be used to clean a room, a subsection of a room, or multiple rooms in a building, for example. The robotic cleaner 10 comprises a motor 12 for driving and directing the robotic cleaner 10, a controller 14 for controlling the motor 12, and a memory 16. The controller 14 is configured to control the motor 12 such that the robotic cleaner 10 follows one or more path defined by the controller 14, wherein the path(s) may be stored in the memory 16. The robotic cleaner 10 also comprises one or more cleaning tools which are used to clean the floor, lower walls, and/or other objects in the room, and a power source (not shown). The robotic cleaner 10 may also comprise other components, such as one or more sensors (e.g. cameras, infrared sensors, Time of Flight sensors, accelerometers, gyroscopes etc.), and also a communication interface which may be used to communicate wirelessly with one or more external devices.

Figure 2:
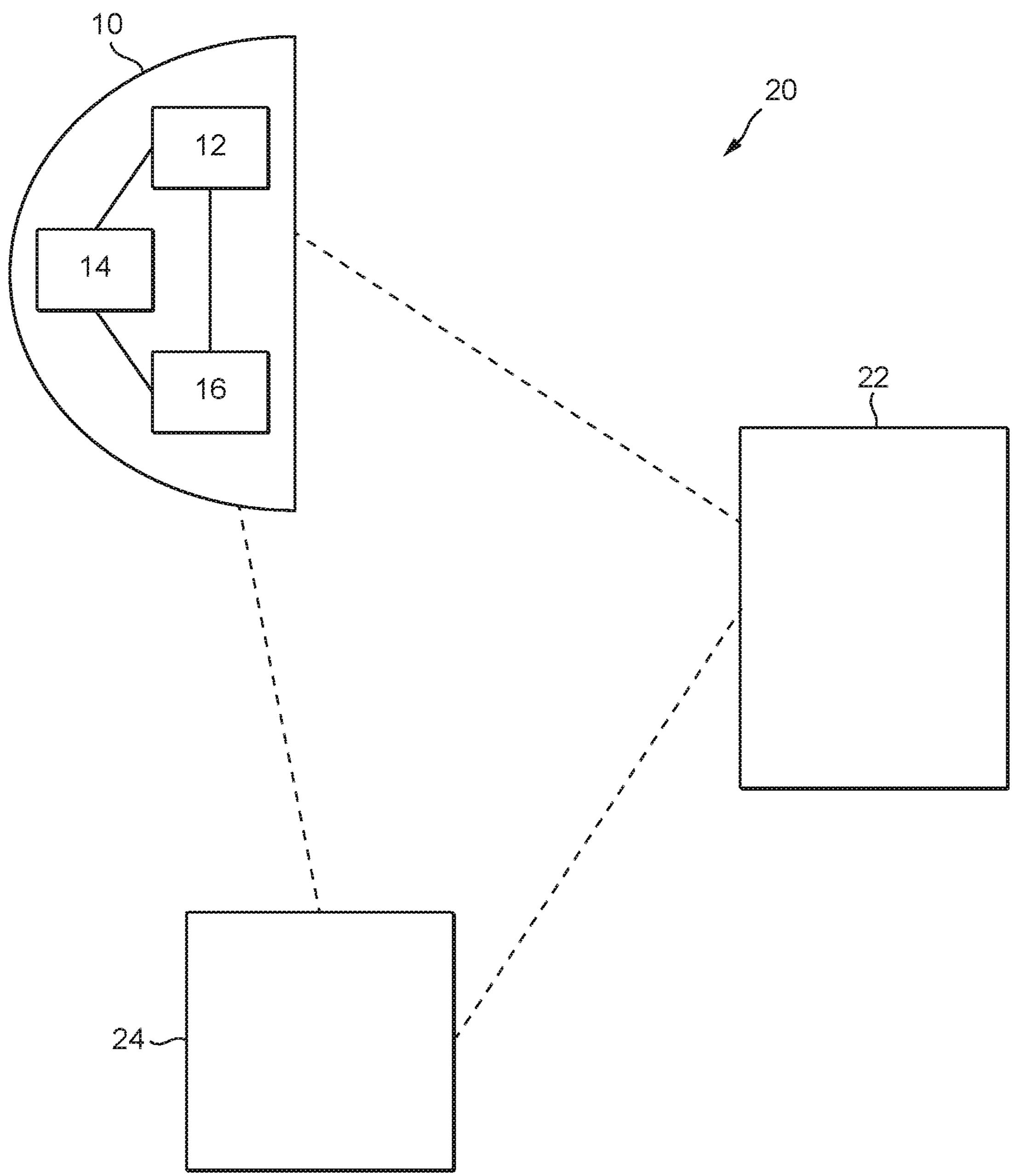
FIG. 2 is a schematic representation of a system for controlling a robotic cleaner.

Such external devices are shown in FIG. 2, which is a schematic of a system 20 for controlling robotic cleaner 10. For completeness, FIG. 2 is not to scale. Example external devices include a mobile device 22 and a remote server 24. In FIG. 2, mobile device 22 and remote server 24 are both in wireless communication with the robotic cleaner. A user of the mobile device 22 may control the robotic cleaner 10 via mobile device 22.

Robotic cleaner 10 may clean an area to be cleaned (e.g. a room) by first performing an open area clean (e.g. centre of the room), and then an edge clean (e.g. along the walls of the room). The path(s) followed by the robotic cleaner in both the open area clean and the edge clean may be determined by the controller 14 of the robotic cleaner 10, by the remote server 24, or by the mobile device 22, and/or saved in memory 16 of the robotic controller or external memory.

The open area cleaning path may be an oil drop cleaning pattern (e.g. a spiral starting from the centre of the room), or some other cleaning pattern.

In order to determine the path(s) to be followed by the robotic cleaner, a set of cleanable perimeter segments is generated. Each cleanable perimeter segment defines a path to be followed by the robotic cleaner around an edge of the area to be cleaned (e.g. along a wall, and/or around objects such as furniture).

Figure 3:
FIG. 3 is a flow diagram of a method for generating a set of cleanable perimeter segments of an area to be cleaned.
Figure 3:
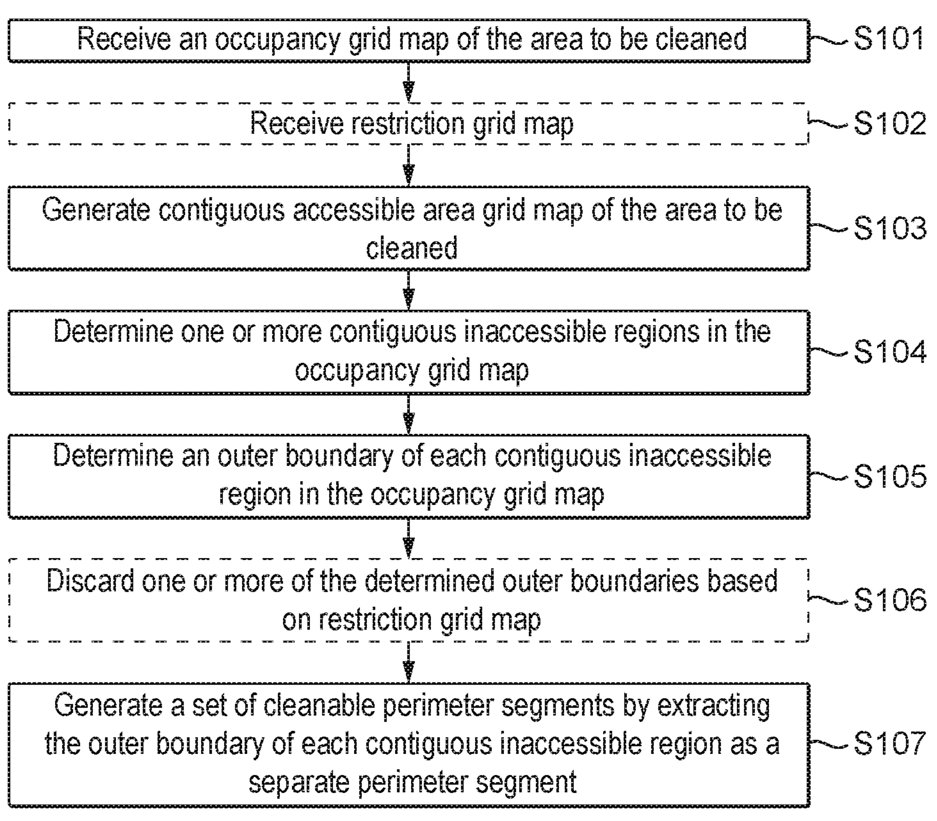

A method 40 for generating a set of cleanable perimeter segments of an area to be cleaned by a robotic cleaner is set out in FIG. 3. The method may be performed by the controller 14 of the robotic cleaner 10 itself, as set out below. Alternatively, the method (or a part thereof) may be performed by an external device, e.g. remote server 24, or mobile device 22. If the method is performed by an external device, the set of cleanable perimeter segments may be transmitted to the robotic cleaner 10 (wirelessly). Once generated, the set of cleanable perimeter segments may be stored in memory 16.

Figure 4A:
FIG. 4A is an example occupancy grid map used in the method of FIG. 3.
Figure 4A:
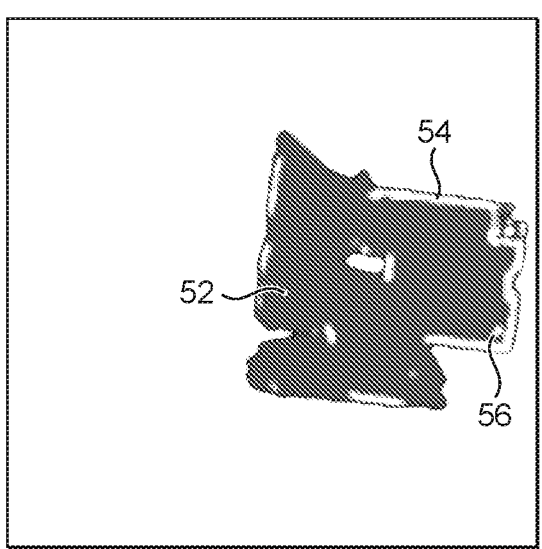

At S101 of FIG. 3, an occupancy grid map of the area to be cleaned is received by the robotic cleaner 10. An example occupancy grid map 50 is shown in FIG. 4A. The occupancy grid map 50 defines the surrounding environment which includes the area to be cleaned 52, and occupied regions 54 of the surrounding environment. Occupied regions 54 may be occupied by objects such as furniture, for example. The occupancy grid map may comprise a plurality of grid elements. Each grid element may be a square grid element, and have the same dimensions. For example, each grid element may be 20 mm×20 mm.

The occupancy grid map may also define a current location 56 of the robotic cleaner. The current location 56 of the robotic cleaner may be received from an external source/device such as a remote server, for example. Alternatively, the robotic cleaner may add a current location of the robotic cleaner using information detected using one or more of its sensors and/or one or more of its cameras. Alternatively, or additionally, the current location may be determined using mapping techniques and/or the robotic cleaner's known original position.

The occupancy grid map may be received by the robotic cleaner from an external device or source, such as a server. Alternatively, the occupancy grid map may be generated based on data captured from a sensor of the robotic cleaner, e.g. during a previous clean, such as during an open area clean performed before the edge clean.

Figure 4B:
FIG. 4B is an example restriction grid map used in the method of FIG. 3.
Figure 4B:
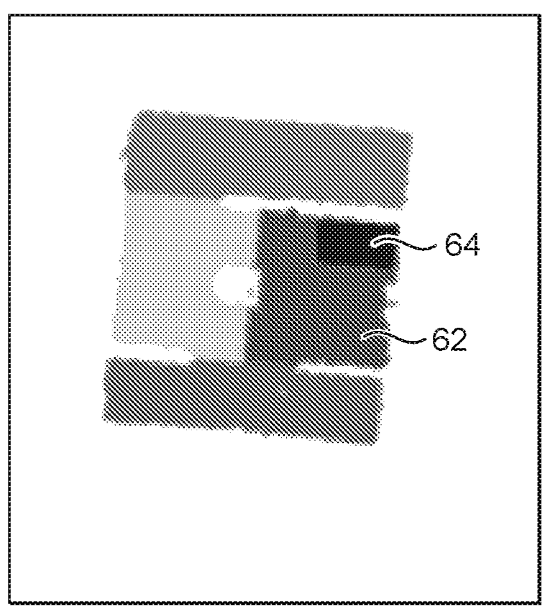

At S102, a restriction grid map is received by the robotic cleaner. An example restriction grid map 60 is shown in FIG. 4B. The restriction grid map defines one or more target regions 62 of the area to be cleaned, and/or one or more forbidden regions 64 of the area to be cleaned. The one or more target regions 62 may be regions of the area to be cleaned that should be prioritized or should be cleaned first/next, and the one or more forbidden regions 64 may be regions of the area to be cleaned that should not be cleaned by the robotic cleaner and/or should not be accessed by the robotic cleaner.

The restriction grid map may be user-defined. For example, a user may specify in the restriction grid map the areas of a room (or subsection of a room) which the robotic cleaner should clean first (e.g. especially dirty areas), and areas which the robotic cleaner should not access or clean (e.g. near stairs). The user may define the target regions and forbidden regions via mobile device 22, for example. As such, the restriction grid map may be received by the controller 14 of the robotic cleaner 10 from mobile device 22.

Alternatively, the restriction grid map may be received from another external device, such as remote server 24. In further examples, the restriction grid map may be stored at the robotic cleaner 10, and is received by the controller 14 from storage 16. The restriction grid map may comprise a plurality of grid elements corresponding to the grid elements of the occupancy grid map. Each grid element may be a square grid element, and have the same dimensions. For example, each grid element may be 20 mm×20 mm.

For completeness, S102 is an optional step in method 40.

At S103, a contiguous accessible area grid map of the area to be cleaned is generated by the robotic cleaner. The contiguous accessible area grid map defines the region of the area to be cleaned that the robotic cleaner can access, and is generated based on the occupancy grid map, and optionally also the current location of the robotic cleaner. The contiguous accessible area grid map may be generated by performing a flood fill (e.g. a circular navigability mask without considering the shape and orientation of the area to be cleaned) from the current location of the robotic cleaner in the occupancy grid map. The contiguous accessible area grid map may be a Boolean element grid map (e.g. true indicates accessible grid element). Again, the contiguous accessible area grid map may comprise a plurality of grid elements corresponding to the grid elements of the occupancy grid map. Each grid element may be a square grid element, and have the same dimensions. For example, each grid element may be 20 mm×20 mm.

Figure 4C:
FIG. 4C is an example contiguous accessible area grid map generated in the method of FIG. 3.
Figure 4C:
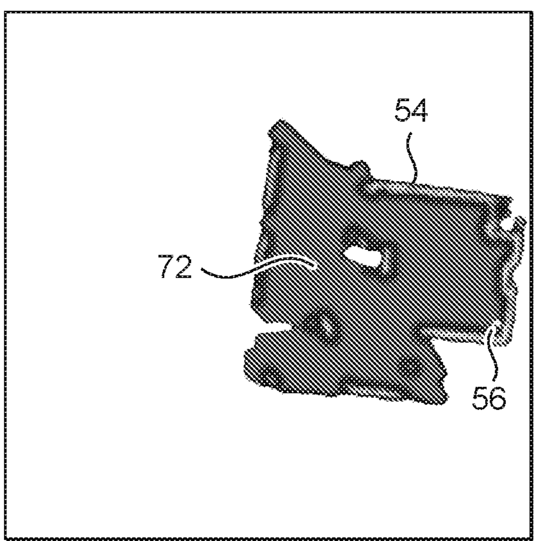

An example contiguous accessible area grid map 70, which defines the region of the area to be cleaned that the robotic cleaner can access 72, is shown in FIG. 4C.

At S104, one or more contiguous inaccessible regions in the occupancy grid map are determined based on the contiguous accessible area grid map. In particular a contiguous region find may be run on the accessible area grid map in order to determine the one or more contiguous inaccessible regions in the occupancy grid map.

Optionally, the method may comprise discarding any contiguous inaccessible regions having an area smaller than a predefined threshold. This means that any inaccessible regions that are deemed too small to clean around their edges are discarded and thus not cleaned. The predefined threshold may be user defined, and/or defined in the memory 16 of the robotic cleaner 10.

At S105, an outer boundary of each contiguous inaccessible region in the occupancy grid map is determined. This step may comprise determining a plurality of accessible grid elements in the occupancy grid map adjacent to the at least one grid element of a contiguous inaccessible region in the occupancy grid map. In this way, the accessible grid elements neighbouring each inaccessible region are selected as the outer boundary of that inaccessible region. The outer boundary of each contiguous inaccessible region may be determined based on a shape and/or dimension of the robotic cleaner. In this way, the outer boundary may not be determined as the neighbouring set of accessible grid elements, but a set of accessible grid elements a predetermined distance (which corresponds to a shape and/or dimension of the robotic clean) away from the inaccessible region. In this way, the robotic cleaner can travel as close as possible to the inaccessible region, despite its size/shape.

Figure 4D:
FIG. 4D is an example of the result of determining an outer boundary of each inaccessible region of the occupancy grid map of FIG. 4A using the contiguous accessible area grid map of FIG. 4C.
Figure 4D:
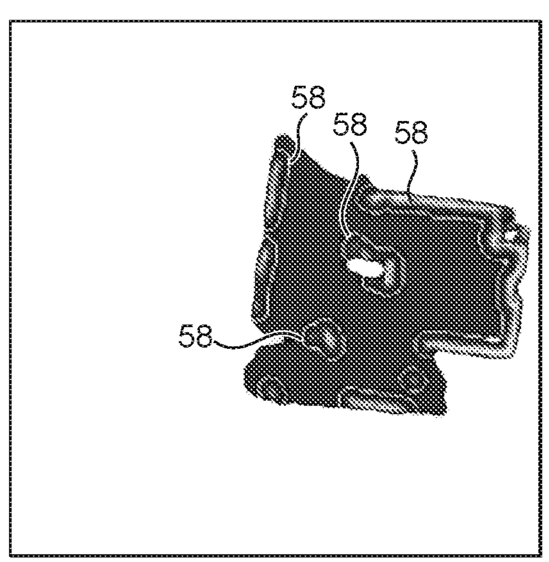

FIG. 4D shows the result of S105; the occupancy grid map 50 with the outer boundary 58 of each contiguous inaccessible region marked thereon.

S106 is an optional step. At S106, a validity check is performed to determined if one or more of the outer boundaries should be discarded. This validity check may be based on the restriction grid map received in S102.

In particular, any outer boundaries located in a forbidden region of the restriction grid map may be discarded. Similarly, any outer boundaries not located in the target region of the restriction grid map may be discarded.

Furthermore, any outer boundaries that have already been cleaned by the robotic cleaner may be discarded.

Figure 4E:
FIG. 4E is an example result of a validity check of the determined outer boundaries of the inaccessible regions, based on the restriction grid map of FIG. 4B.
Figure 4E:
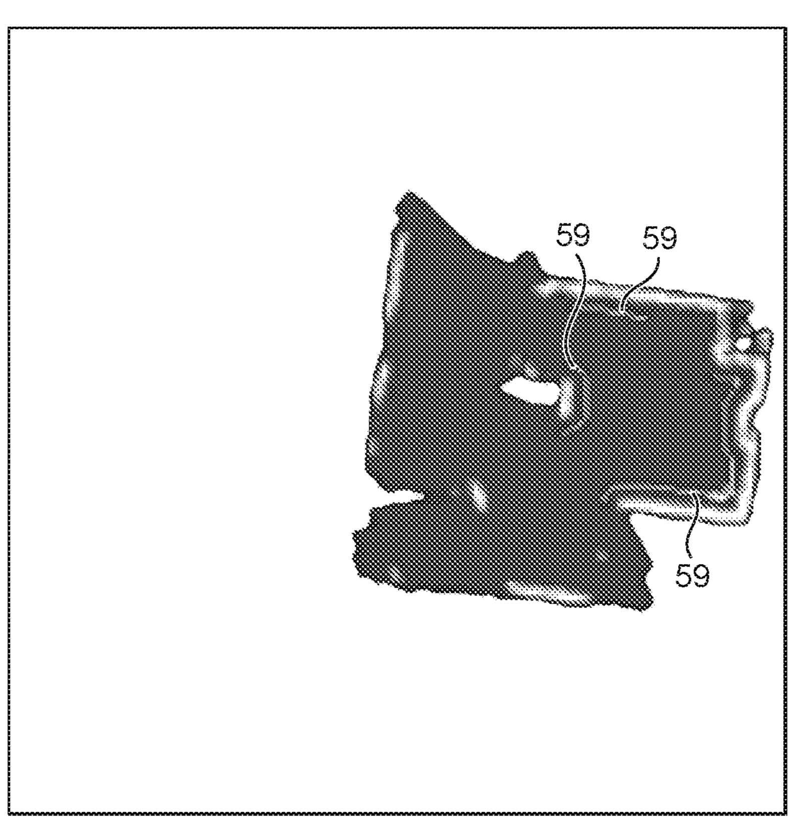

The result 80 of the validity check of S106 is shown in FIG. 4E. Here, only three outer boundaries 59 are maintained following the validity check; each of these outer boundaries 59 are in the target region 62 of the restriction grid map 60 received at S102. None of the outer boundaries 59 shown in FIG. 4E are in the forbidden region 64 of the restriction grid map 60.

At S107, a set of cleanable perimeter segments are generated. Each cleanable perimeter segment comprises a plurality of sequential grid elements defining the path to be followed by the robotic cleaner.

Figure 4F:
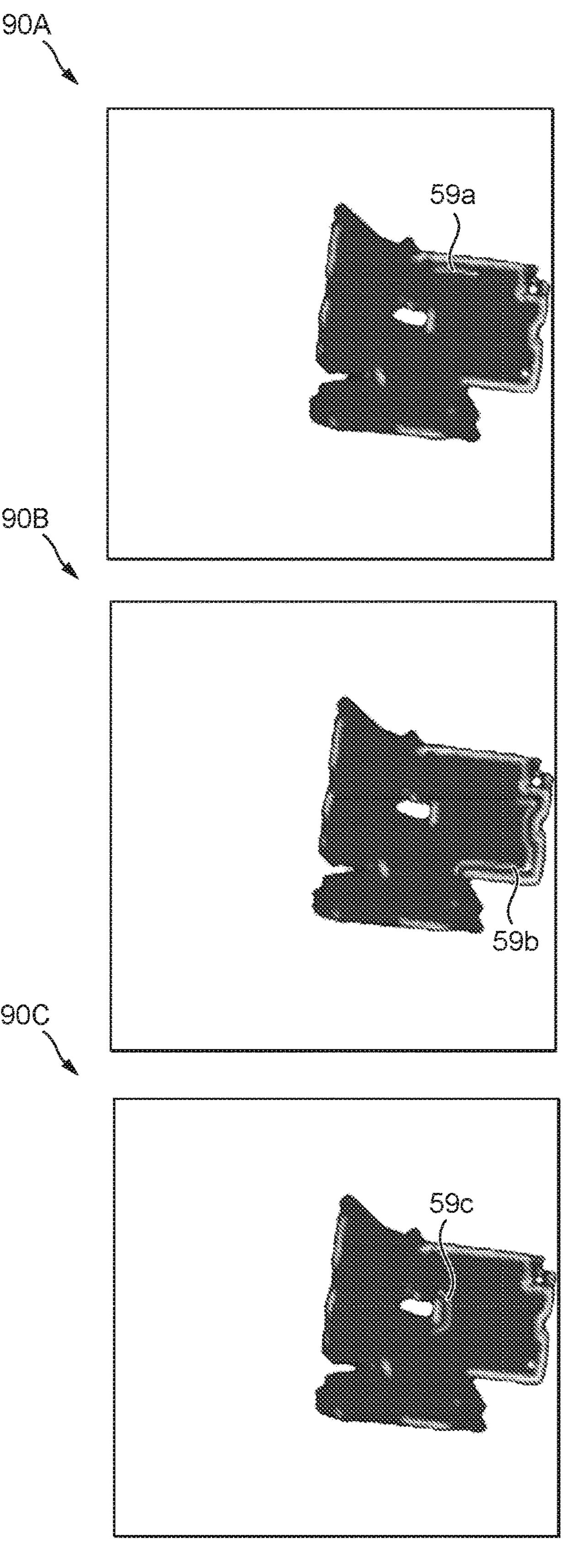
FIG. 4F shows example extracted grid maps with the outer boundary of each contiguous inaccessible region extracted as a separate cleanable perimeter segment.

The outer boundary of each contiguous inaccessible region is extracted as a separate perimeter segment 59*a-c*, as shown in grid maps 90A-90C of FIG. 4F.

Optionally, the method may comprise discarding any perimeter segments having a number of grid elements less than a predefined threshold, which may be user defined and/or saved in memory 16. In this way, perimeter segments that are deemed too short are not cleaned.

Each perimeter segment may define a path to be followed along a same direction along the respective edge. The grid maps 90A-90C of FIG. 4F are upside down to the real grid, and thus each perimeter segment 59*a-c* defines a path to be followed in a left direction along the respective edge. In other examples, each perimeter segment may define a path to be followed in a right direction along the respective edge.

The set of cleanable perimeter segments may then be output, e.g. to a motor of the robotic cleaner, such that the robotic cleaner follows the path of the cleanable perimeter segments during an edge clean.

For completeness, the method steps of method 40 may not necessarily be performed in the order shown in FIG. 3.

Figure 5:
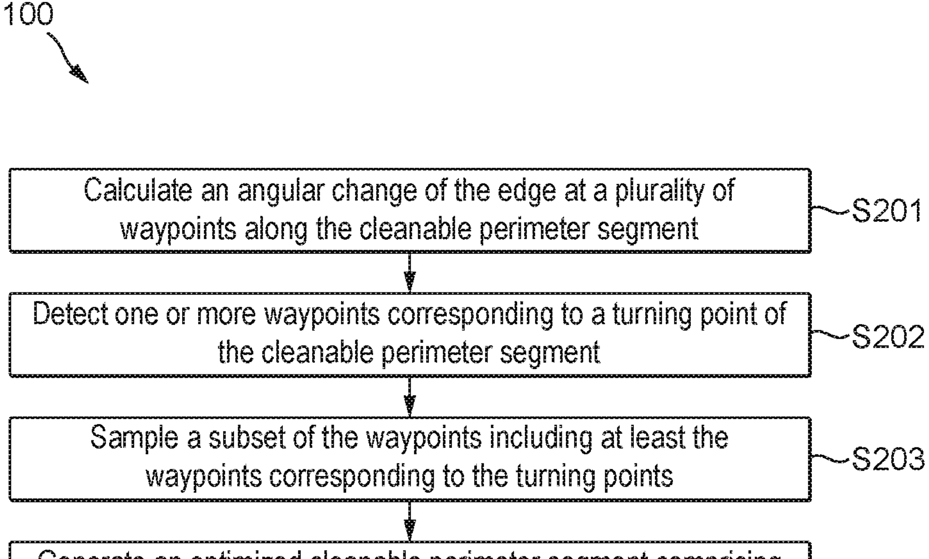
FIG. 5 is a flow diagram of a method for processing a cleanable perimeter segment of an area to be cleaned.

A method 100 for processing a cleanable perimeter segment of the area to be cleaned by the robotic cleaner is set out in FIG. 5. In some examples, each of the set of cleanable perimeter segments generated in method 40 shown in FIG. 3 may be processed according to the method 100 of FIG. 5.

The method 100 may be performed by the controller 14 of the robotic cleaner 10 itself, as set out below. Alternatively, the method (or a part thereof) may be performed by an external device, e.g. remote server 24, or mobile device 22. If the method is performed by an external device, the optimized cleanable perimeter segment(s) may be transmitted to the robotic cleaner 10 (wirelessly). Once generated, the optimized cleanable perimeter segment(s) may be stored in memory 16.

First, a cleanable perimeter segment is received (not shown in FIG. 5). The cleanable perimeter segment may be one of the set of cleanable perimeter segments generated in method 40 of FIG. 3. The cleanable perimeter segment may be received by the controller 14 from an external source, e.g. a remote server, or from memory 16 of the robotic cleaner 10.

At S201, an angular change of the edge corresponding to the cleanable perimeter segment is calculated at a plurality of waypoints along the cleanable perimeter segment. The angular change of a particular waypoint may be calculated by calculating an angle from a vector from a previous neighbouring waypoint to the particular waypoint, towards the vector from the particular waypoint to a next neighbouring waypoint.

Each waypoint for which the angular change is calculated may correspond to each grid element of the cleanable perimeter segment. Therefore, the angular change of the edge may be calculated for each grid element of the perimeter segment.

Next, at S202, one or more waypoints corresponding to a turning point of the cleanable perimeter segment are detected. A waypoint corresponds to a turning point if a magnitude of the angular change at the waypoint is greater than or equal to a predefined angular threshold. By comparing a magnitude of the angular change to the predefined angular threshold, both internal and external corners can be detected.

The predefined angular threshold may be between 20° and 80°, more preferably between 30° and 60°, more preferably between 40° and 50°. In preferred examples, the predefined angular threshold may be 45°.

Figure 6:
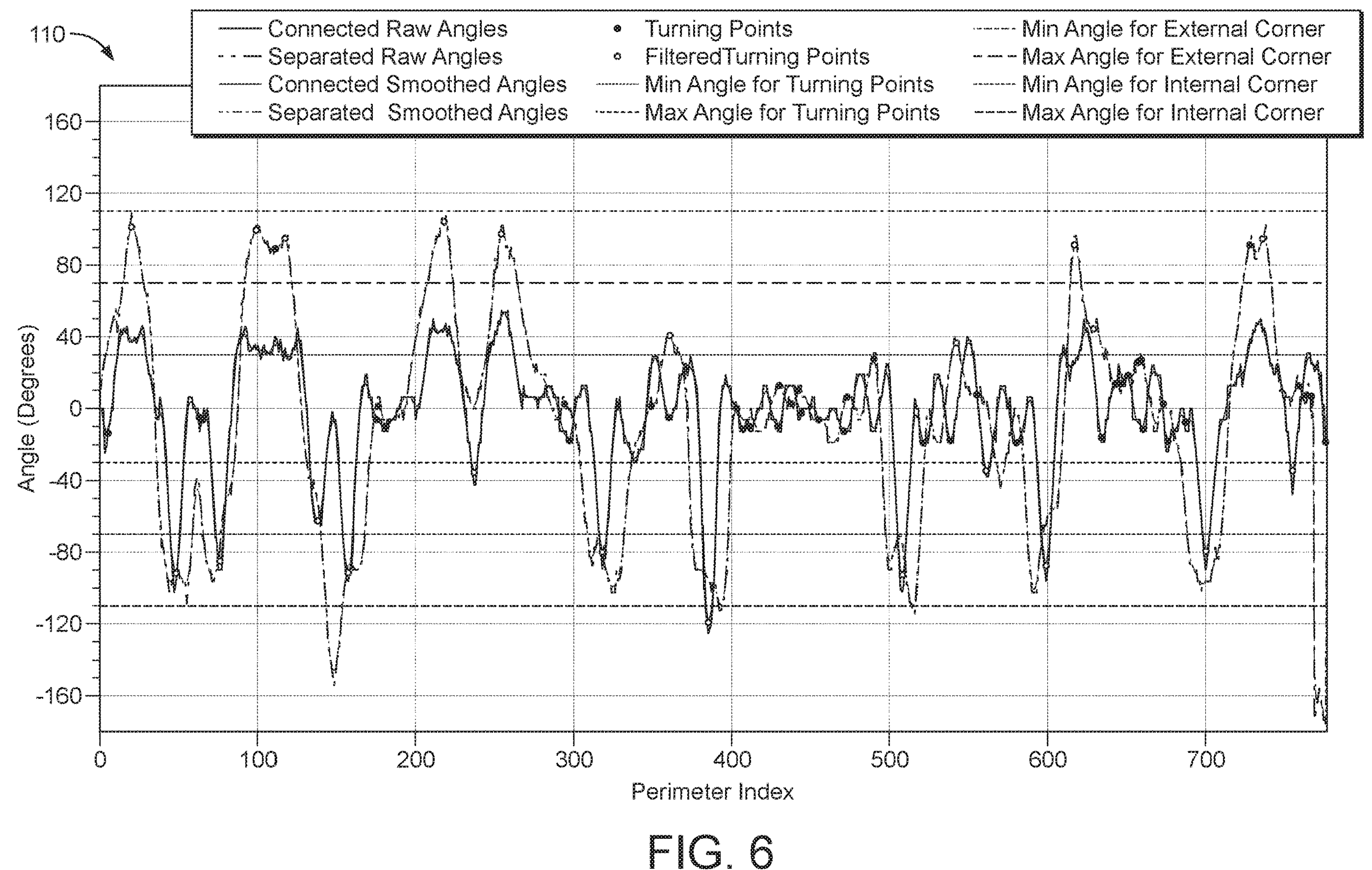
FIG. 6 is a plot of calculated angular changes of waypoints along a cleanable perimeter segment.

An example plot 110 of the calculated angular changes of waypoints along the cleanable perimeter segment is shown in FIG. 6. Any waypoints with a corresponding magnitude angular change of greater than 450 are considered as turning points.

At S203, a subset of the waypoints are sampled. The sampled subset includes at least the waypoints corresponding to the turning points. Preferably, the sampled subset of waypoints also includes one or more straight edge waypoints. A waypoint may be a straight edge waypoint if a magnitude of the angular change is less than the predefined angular threshold (e.g. less than 45°). Alternatively, a waypoint may be a straight edge waypoint if a magnitude of the corresponding angular change is less than 40°, more preferably, 30°, more preferably 20°, etc. Accordingly, the sampled subset of waypoints preferably includes the waypoints corresponding to the turning points, and some waypoints corresponding to a straight edge.

Preferably the distance between neighbouring waypoints in the sampled subset of waypoints is in a range between a lower predefined distance threshold and a higher predefined distance threshold. This ensures that there is sufficient resolution to accurately track the edge when cleaning, without having a too high resolution which may lead to an inefficient clean and requiring increased processing power.

Preferably the distance between neighbouring waypoints is between 3 and 7 grid elements, e.g. 4 grid elements for example. Each grid element may be 20 mm×20 mm in dimension, for example.

Method 100 may further comprise determining whether, within a subsection of the cleanable perimeter segment (wherein the subsection may have a distance equal to the lower predefined distance threshold, or the higher predefined distance threshold), there are a plurality of waypoints corresponding to a turning point. If there are a plurality of waypoints corresponding to a turning point within the subsection of the cleanable perimeter segment, the method may further comprise determining the waypoint within the subsection having the largest angular change and maintaining that waypoint, but discarding the other waypoints corresponding to a turning point within the subsection.

Accordingly, only the turning point with the largest turning angle is maintained as a waypoint in a subsection of the cleanable perimeter distance equal to the predefined shortest distance between waypoints.

At S204 an optimized cleanable perimeter segment is generated. The optimized cleanable perimeter segment comprises the sampled subset of waypoints and defines the path to be followed by the robotic cleaner around the edge of the area to be cleaned.

Figure 7:
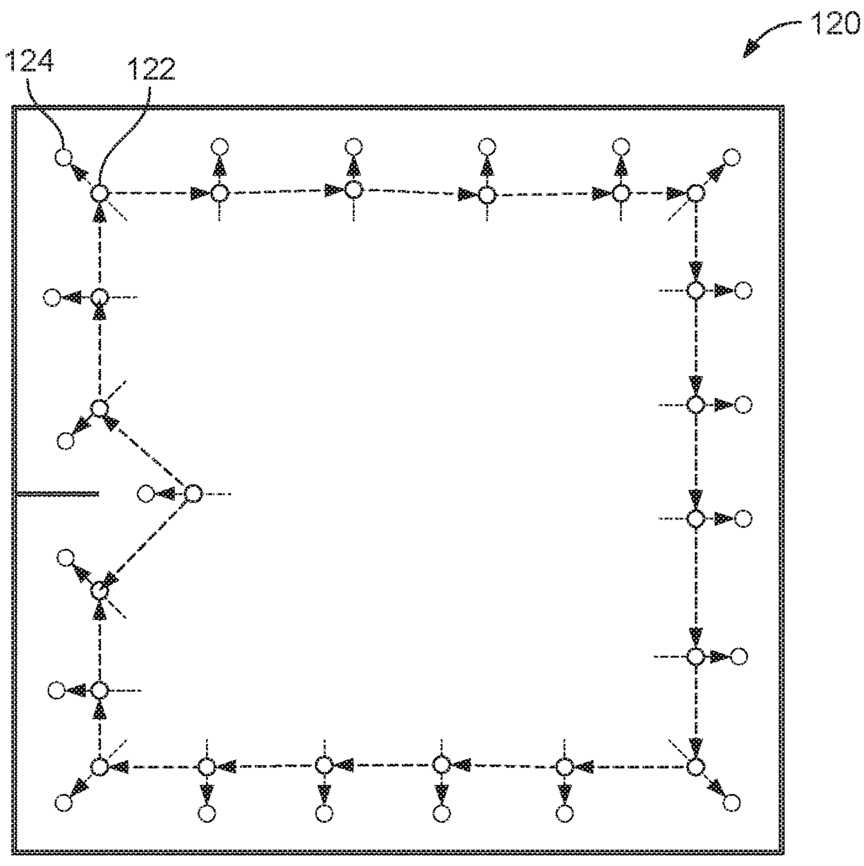
FIG. 7 is a schematic diagram showing the shifting of waypoints according to a method disclosed herein.

Optionally, at S205, and as shown in schematic diagram 120 of FIG. 7, each waypoint in the optimized cleanable perimeter segment is shifted towards a closest edge of the area to be cleaned (e.g. from position 122 to position 124. Each waypoint may be shifted by a predefined distance, which may be approximately 40 mm, or two grid elements, for example.

Figure 8:
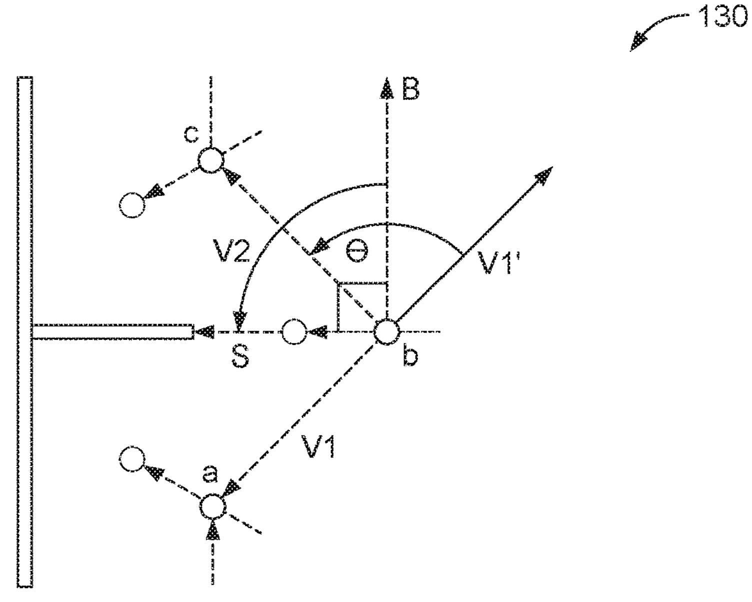
FIG. 8 is a zoomed in version of FIG. 7 showing calculation of the direction in which a waypoint is shifted.

As shown in FIG. 7, a particular waypoint is shifted towards a closest edge in a direction perpendicular to a bisector of the angle between a vector from a previous neighbouring waypoint to the particular waypoint, and the vector from the particular waypoint to a next neighbouring waypoint. FIG. 8 is a zoomed in version of FIG. 8, with the angles labelled to show the direction in which a particular waypoint b is shifted.

In the schematic diagram 130 of FIG. 7, V1 is the vector between the previous neighbouring waypoint a and the particular waypoint b, and V2 is the vector between the particular waypoint b and the next neighbouring waypoint c. V1' is the extension of vector V1 used to help illustrate the angle θ between V1 and V2. Therefore, the angle from vector V1 from a previous neighbouring waypoint a to the particular waypoint b, towards the vector V2 from the particular waypoint B to a next neighbouring waypoint c is used to calculate the angular change of the edge at waypoint b. Bisector B of the angle θ between V1 and V2 is shown in FIG. 8. Waypoint b is then shifted towards the edge in a direction perpendicular to the bisector B, as shown by arrow S in FIG. 7.

A closest edge for each waypoint may be detected by a local sensor of the robotic cleaner, such as a camera, vision sensor, infrared sensor, or time of flight sensor, for example.

Figure 9:
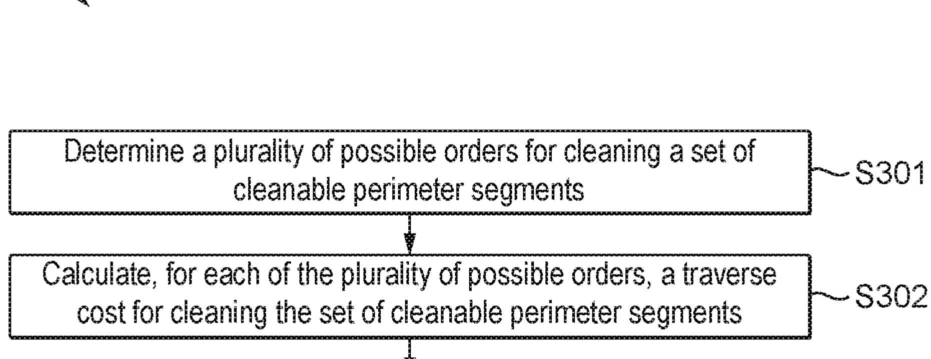
FIG. 9 is a flow diagram of a method for determining an order for cleaning a set of cleanable perimeter segments of an area to be cleaned by a robotic cleaner.

A method 300 for determining an order for cleaning a set of cleanable perimeter segments of an area to be cleaned by a robotic cleaner, is shown in FIG. 9. Each cleanable perimeter segment defines a path to be followed by the robotic cleaner around an edge of the area to be cleaned from a head of the perimeter segment to a tail of the perimeter segment. In some examples, an order of the set of cleanable perimeter segments generated in method 40 shown in FIG. 3 may be ordered according to the method 200 shown in FIG. 9.

The method 100 may be performed by the controller 14 of the robotic cleaner 10 itself, as set out below. Alternatively, the method (or a part thereof) may be performed by an external device, e.g. remote server 24, or mobile device 22. If the method is performed by an external device, the optimized cleanable perimeter segment(s) may be transmitted to the robotic cleaner 10 (wirelessly). Once generated, the optimized cleanable perimeter segment(s) may be stored in memory 16.

First, a set of cleanable perimeter segments is received (not shown in FIG. 9). The set of cleanable perimeter segments may be the set of cleanable perimeter segments generated in method 40 of FIG. 3. The set of cleanable perimeter segments may be received by the controller 14 from an external source, e.g. a remote server, or from memory 16 of the robotic cleaner 10.

At S301, a plurality of possible orders for cleaning the set of cleanable perimeter segments are determined. Optionally, all possible orders are determined.

Figure 10:
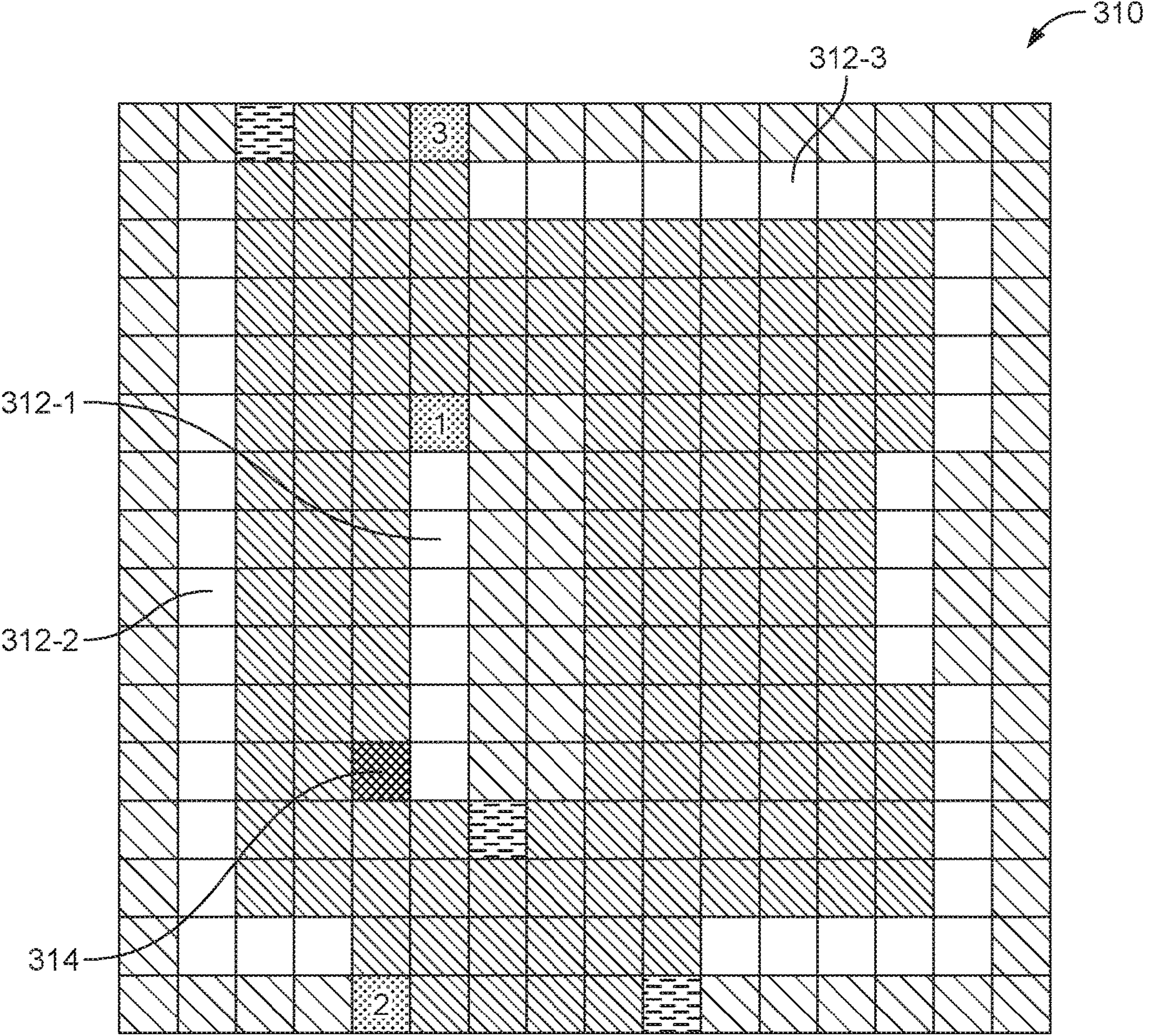
FIG. 10 is an example plot 310 of an area to be cleaned with three perimeter segments 312-1, 312-2, 313-3 defined therein.

FIG. 10 shows an example plot 310 of an area to be cleaned with three perimeter segments 312-1, 312-2, 313-3 defined therein. The perimeter segments extend from a respective head (noted with 1, 2 and 3 for perimeter segments 312-1, 312-2, 312-3, respectively, in FIG. 10), to a respective tail. The robotic cleaner's current location is also shown in plot 310, labelled 314.

Based on the three perimeter segments shown in FIG. 10, there are six possible orders, as follows:

| Possible orders |
|---|
| 314 > 312-1 > 312-2 > 312-3 |
| 314 > 312-2 > 312-1 > 312-3 |
| 314 > 312-2 > 312-3 > 312-1 |
| 314 > 312-3 > 312-2 > 312-1 |
| 314 > 312-3 > 312-1 > 312-2 |
| 314 > 312-1 > 312-3 > 312-2 |

Next, at S302, for each of the plurality of possible orders, a traverse cost for cleaning the set of cleanable perimeter segments is calculated. The traverse cost for each of the plurality of possible orders is calculated based on a current location of the robotic cleaning device, and the relative distances between the cleanable perimeter segments in the respective order. In particular, the traverse cost for an order may be calculated at least in part by summing the relative distance between the current location of the robotic cleaner and the head of the first perimeter segment in the order, and for each subsequent perimeter segment in the order, the relative distance between the head of that perimeter segment and the tail of the previous perimeter segment in the order.

For example, for the example plot shown in FIG. 10, the calculated traverse costs may be as follows:

| Order | Total traverse costs |
|---|---|
| 314 > 312-1 > 312-2 > 312-3 | 6 + 4 + 3 = 13 |
| 314 > 312-2 > 312-1 > 312-3 | 4 + 6 + 12 = 22 |
| 314 > 312-2 > 312-3 > 312-1 | 4 + 3 + 11 = 18 |
| 314 > 312-3 > 312-2 > 312-1 | 11 + 5 + 6 = 22 |
| 314 > 312-3 > 312-1 > 312-2 | 11 + 11 + 4 = 26 |
| 314 > 312-1 > 312-3 > 312-2 | 6 + 12 + 5 = 23 |

Here, for each order, the number of grid elements between (i) the current location of the robotic cleaner and the head of the first perimeter segment; (ii) the tail of the first perimeter segment and the head of the second perimeter segment; and (iii) the tail of the second perimeter segment and the head of the third perimeter segment, are summed to determine the total traverse costs.

Finally at S303, an optimized order for cleaning the set of cleanable perimeter segments is determined based on the calculated traverse costs for each of the plurality of possible orders. In particular, the optimized order may be the order with the smallest traverse costs.

As such, returning to the example plot shown in FIG. 10, the optimized order with the smallest traverse cost is the order 314>312-1>312-2>312-3 (which has the smallest total traverse cost of 13 grid elements).

For comparison, if the order is chosen based on a closest perimeter segment rather than using method 200, the order chosen would be 314>312-2>312-3>312-1, which has a total traverse cost of 18 grid elements. This highlights how optimizing the order of cleaning the cleanable perimeter segments according to method 200 reduces total traverse time and thus results in a more efficient edge clean.

The traverse costs for an order may be calculated at least in part using a weight factor between 0 and 1 to account for the current location of the robotic cleaner. This balances the distance between the robotic cleaner's current location and the perimeter section's head and traverse distance among different perimeter sections. The traverse cost for an order may be calculated using the following formular:

Total cost for an order=(weight factor)×(relative distance between the current location of the robotic cleaner and the head of the first perimeter segment in the order)+(1-weight factor)×(for each subsequent perimeter segment in the order, the relative distance between the head of that perimeter segment and the tail of the previous perimeter segment in the order).

The optimized order may be disregarded under a number of conditions.

In particular, the optimized order may be disregarded if the distance between the robotic cleaner's current location and the head of the first perimeter segment in the optimized order is too large (i.e. greater than a predefined threshold). In these cases, the order for cleaning the set of cleanable perimeter segments is based on a closest head of a perimeter segment relative to the current location of the robotic cleaner.

Alternatively/additionally, the optimized order may be disregarded if the distance between the current location of the robotic cleaner and a head of a perimeter segment different to the first perimeter segment in the optimized order is less than predefined threshold. In these cases, the order for cleaning the set of cleanable perimeter segments is based on a closest head of a perimeter segment relative to the current location of the robotic cleaner.

As such, the optimized order may be ignored if (i) the first perimeter segment in the optimized order is too far away; or (ii) there is a very close alternative perimeter segment.

The traverse costs for each possible order, and the optimized order, may be calculated only when one or more conditions are met.

A first condition may be that the distance between the current location of the robotic cleaner and a head of a perimeter segment is greater than a predefined threshold. As such, the optimized method may not be performed when there is a very close perimeter segment. In these cases, the order for cleaning the set of cleanable perimeter segments is based on a closest head of a perimeter segment relative to the current location of the robotic cleaner.

A second condition may be when the number of possible orders for cleaning the set of cleanable perimeter segments is less than a predefined threshold. As such, there is a maximum number of perimeter segments for which the optimized order may be calculated for. This balances the need for an optimized route with the additional processing costs required to determine the optimized route.

The method may further comprise discarding any perimeter segments in the set of perimeter segments that have already been cleaned prior to determining the plurality of possible orders for cleaning the set of perimeter segments. In this way, the same region of the area to be cleaned is not cleaned multiple times, thus providing a more efficient cleaning pattern.

After the set of cleanable perimeter segments have been generated, processed, and an optimized order detected, the robotic cleaner may perform an edge clean in a path defined by the optimized order of the processed set of cleanable perimeter segments. This may provide an efficient edge clean, which closely matches the edges and corners, thus providing a more thorough edge and corner clean.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method for generating a set of cleanable perimeter segments of an area to be cleaned by a robotic cleaner, each cleanable perimeter segment defining a path to be followed by the robotic cleaner around an edge of the area to be cleaned, the method comprising:

receiving an occupancy grid map of the area to be cleaned, wherein the occupancy grid map defines occupied regions of the area to be cleaned;

generating a contiguous accessible area grid map of the area to be cleaned based on the occupancy grid map, wherein the contiguous accessible area grid map defines the region of the area to be cleaned that the robotic cleaner can access;

determining one or more contiguous inaccessible regions in the occupancy grid map based on the contiguous accessible area grid map;

determining an outer boundary of each contiguous inaccessible region in the occupancy grid map;

generating the set of cleanable perimeter segments by extracting the outer boundary of each contiguous inaccessible region as a separate perimeter segment, each perimeter segment comprising a plurality of sequential grid elements defining the path to be followed by the robotic cleaner around an edge of the area to be cleaned, and discarding any perimeter segments having a number of grid elements less than a predefined threshold; and outputting the set of cleanable perimeter segments to a controller of a motor of the robotic cleaner to cause the robotic cleaner to clean along the path.

2. The method of claim 1, wherein the contiguous accessible grid map is generated based on a current location of the robotic cleaner.

3. The method of claim 1, further comprising receiving a restriction grid map defining one or more target regions of the area to be cleaned, or one or more forbidden regions of the area to be cleaned.

4. The method of claim 3, wherein the restriction grid map is user-defined.

5. The method of claim 3, further comprising discarding any outer boundaries of the one or more contiguous inaccessible regions if they are located in a forbidden region defined in the restriction grid map.

6. The method of claim 3, further comprising discarding any outer boundaries of the one or more contiguous inaccessible regions if they are not located in a target region defined in the restriction grid map.

7. The method of claim 1, further comprising discarding any outer boundaries of the one or more contiguous inaccessible regions if they are already cleaned.

8. The method of claim 1, wherein generating the contiguous accessible area grid map comprises performing a flood fill from a current location of the robotic cleaner.

9. The method of claim 1, wherein the contiguous accessible area grid map is a Boolean element grid map.

10. The method of claim 1, wherein the one or more contiguous inaccessible regions are determined by running a contiguous region find on the contiguous accessible area grid map.

11. The method of claim 1, further comprising discarding any inaccessible regions having an area smaller than a predefined threshold.

12. The method of claim 1, wherein the plurality of sequential grid elements in each perimeter segment define a path to be followed in a left direction along the edge.

13. The method of claim 1, wherein determining an outer boundary of each contiguous inaccessible region comprises determining a plurality of accessible grid elements in the occupancy grid map adjacent to at least one grid element of an inaccessible region in the occupancy grid map.

14. The method of claim 1, wherein the outer boundary of each contiguous inaccessible region is determined based on a shape and/or dimension of the robotic cleaner.

15. The method of claim 1, wherein the method is performed by a processor located on the robotic cleaner.

16. The method of claim 1, wherein the occupancy grid map is generated based on data captured from a sensor of the robotic cleaner.

17. A system including one or more processors and a memory, the memory containing machine executable instructions which, when executed on the one or more processors, cause the one or more processors to perform the method of claim 1.

18. A robotic cleaner comprising the system of claim 17.

19. A non-transitory computer readable storage medium containing machine executable instructions which, when executed on a processor, cause the processor to perform the method of claim 1.

* * * * *